US008824363B2

(12) United States Patent
Bardout

(10) Patent No.: US 8,824,363 B2
(45) Date of Patent: Sep. 2, 2014

(54) SATELLITE TELECOMMUNICATION SYSTEM COMPRISING A MECHANISM FOR SEPERATING MESSAGES TRANSMITTED BY A PLURALITY OF TRANSMITTERS

(75) Inventor: Yves Bardout, Toulouse (FR)

(73) Assignee: Thales, Neuilly sur Seine (FR)

( * ) Notice: Subject to any disclaimer, the term of this patent is extended or adjusted under 35 U.S.C. 154(b) by 552 days.

(21) Appl. No.: 13/111,385

(22) Filed: May 19, 2011

(65) Prior Publication Data
US 2012/0120870 A1 May 17, 2012

(30) Foreign Application Priority Data
May 21, 2010 (FR) ...................................... 10 02155

(51) Int. Cl.
*H04J 3/08* (2006.01)
*H04J 1/02* (2006.01)
(52) U.S. Cl.
USPC ........................................... 370/326; 370/497
(58) Field of Classification Search
CPC .................................................. H04W 84/06
USPC ........................................................ 370/326
See application file for complete search history.

(56) References Cited

U.S. PATENT DOCUMENTS

| 6,539,200 | B1* | 3/2003 | Schiff | 455/12.1 |
| 2002/0039900 | A1* | 4/2002 | Wiedeman et al. | 455/428 |
| 2004/0259497 | A1* | 12/2004 | Dent | 455/13.3 |
| 2007/0232227 | A1* | 10/2007 | Draganov et al. | 455/11.1 |
| 2008/0304597 | A1* | 12/2008 | Peach | 375/324 |
| 2009/0140887 | A1* | 6/2009 | Breed et al. | 340/990 |
| 2011/0032866 | A1* | 2/2011 | Leabman | 370/316 |

FOREIGN PATENT DOCUMENTS

| JP | 2001-77738 A | 3/2001 |
| WO | 00/59136 A1 | 10/2000 |
| WO | 01/65726 A1 | 9/2001 |

OTHER PUBLICATIONS

Holsten S: "Global maritime surveillance with satellite-based AIS", May 11, 2009, Oceans 2009-Europe, 2009. Oceans '09, IEEE, Piscataway, NJ, USA, pp. 1-4, XP031540752.
Robert J. Mailoux: "Phased Array Antenna Handbook," Paragraph 3.3.3, second edition, Artech House Antennas and Propagation Library, Pattern Synthesis for Linear and Planar Arrays.

* cited by examiner

*Primary Examiner* — Gerald Smarth
(74) *Attorney, Agent, or Firm* — Baker & Hostetler LLP

(57) ABSTRACT

A satellite telecommunications system comprises at least one satellite receiving signals originating from a plurality of transmitters present in a surveillance zone called a task, the transmission of the signals by the transmitters being discontinuous and organized into time slots. The satellite includes an array of reception antennas, a set of digital reception filters being associated with each antenna. The satellite also includes means for separating the signals originating from various transmitters and colliding in one and the same slot, said separation being carried out by adapting the coefficients of the digital reception filters, said coefficients being deduced from predictions of the position of the transmitters.

13 Claims, 2 Drawing Sheets

Figure 1:
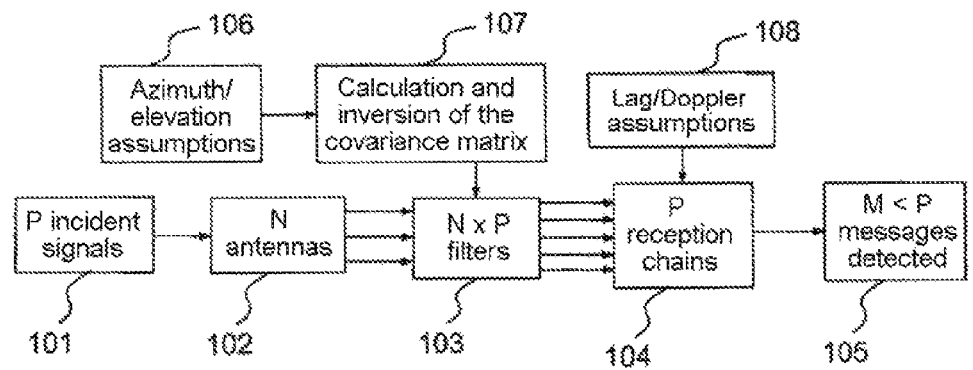

SATELLITE TELECOMMUNICATION SYSTEM COMPRISING A MECHANISM FOR SEPERATING MESSAGES TRANSMITTED BY A PLURALITY OF TRANSMITTERS

CROSS-REFERENCE TO RELATED APPLICATION

This application claims priority to foreign French patent application No. FR 1002155, filed on May 21, 2010, the disclosure of which is incorporated herein by reference in its entirety.

FIELD OF THE INVENTION

The invention relates to a satellite telecommunication system comprising a mechanism for separating messages transmitted by a plurality of transmitters. It is applied notably to the fields of identification systems such as AIS, the acronym standing for the expression "Automatic Identification System".

BACKGROUND OF THE INVENTION

In a satellite communications system receiving signals originating from a plurality of distinct transmitters, the reception performance depends notably on the capacity to separate said signals so as to be able to extract therefrom the message, the transported digital data. The multiplexing of the signals in time, frequency and code is the distinguishing feature of TDMA technologies, the acronym standing for the expression "Time Division Multiple Access", FDMA the acronym standing for the expression "Frequency Division Multiple Access", or CDMA the acronym standing for the expression "Code Division Multiple Access". Space diversity techniques can also be used, notably and are particularly effective in the case of transmission of signals transmitted by a plurality of transmitters of different positions.

In satellite-based maritime surveillance systems, for example of AIS type, the transmission of messages is organized automatically in cells of about 25 nautical miles. Reception in orbit for a task 2500 nautical miles in diameter implies that the satellite must simultaneously manage nearly ten thousand cells. Moreover, certain zones are particularly active in transmission due to the fact that a large number of transmitters is present therein. It is therefore necessary for the satellite to have the capacity to receive a plurality of distinct incident signals. This issue is essential in relation to the satellite or airborne reception of uncoordinated signals, said signals being transmitted for example by transmitters moving on land or at sea.

The relative position of the transmitter with respect to the receiver has an influence on the reception of the signal, in particular on the phase, on the lag and on the Doppler shift. This relative position is customarily expressed using azimuth, elevation and distance coordinates. Processing based on receiving the signals on several antennas and taking into account the phase, the lag and the Doppler shift allows separation of the signals originating from several transmitters even if the latter are in collision, that is to say if they are received simultaneously in one and the same frequency domain. Thus, it is possible by processing to enhance or to eliminate the contribution of certain signals with respect to others, and therefore thus to improve the separation. The type of processing chosen is essential so as to obtain maximum separation of the incident signals and improve the effectiveness of the transmission system, notably in terms of economy of bandwidth.

In order to optimize the system separation capacity, prior art solutions may be implemented. Thus, it is possible to use directional antennas at the level of the satellite receiver, to increase the number of reception antennas, to increase the number of satellites in the constellation and to apply interference suppression algorithms.

By way of example, the use of a fixed directional or scanning antenna by using analog beamforming techniques, makes it possible to reduce the number of messages received simultaneously for a given spot. The drawback of this solution is a decrease in coverage, giving rise to a longer revisit duration or else requiring a significant number of antennas and/or satellites.

It is also possible to use digital and/or analog processing operations relying on antenna arrays positioned at the level of the satellite allowing separation of the signals received, called spatial separation in the subsequent description.

Spatial separation customarily calls upon techniques based on systems of antennas, such as for example the SRFF systems, the acronym standing for the expression "Single Reflector Focal Feed", the DRAF systems, the acronym standing for the expression "Dual Reflector Antenna Feed", and other array stream systems including elements of patch, helix, monopole or dipole types.

Digital processing operations are associated with these systems of antennas. Thus, the reference solution called Spatial Adaptive Filtering (SAF) is based on the use of a direct-transmit antenna array associated with a digital beamforming processing.

The technologies of adaptive filtering encompass a set of techniques such as:
the least squares scheme, designated by the acronym LMS standing for the expression "Least Mean Square" and allowing adaptation of the receiver to a known input signal such as a conditioning sequence or a code customarily designated by the expression "training sequence";
the optimization of the signal-to-noise ratio so as to allow the suppression of the side lobes and the multiple lobes of the spectrum of the signal received;
the determination of a table of pre-calculated weights applied to the signals originating from transmitters whose position is known;
the use of retro-directional rays, the principle being to form a directional ray toward the transmitters received;
the use of a generalized diagram based on the inversion of the covariance matrix representative of the state of the transmission channel.

In satellite communication systems receiving signals originating from a plurality of transmitters, the issue is to separate long messages of several milliseconds, for example 26 ms, and in contradistinction to the signals transmitted in the form of pulses which possess an intrinsic temporal separation, it is necessary to obtain a spatial separation of transmitted signals overlapping at reception.

SUMMARY OF THE INVENTION

An aim of the invention is notably to alleviate the aforementioned drawbacks.

For this purpose a subject of the invention is a satellite telecommunications system comprising at least one satellite receiving signals originating from a plurality of transmitters present in a surveillance zone called a task, the transmission of the signals by the transmitters being discontinuous and organized into time slots, the satellite comprising an array of reception antennas, a set of digital reception filters being associated with each antenna. The satellite comprises means for separating the signals originating from various transmitters and colliding in one and the same slot, said separation being carried out by adapting the coefficients of the digital reception filters, said coefficients being deduced from predictions of the position of the transmitters.

In one embodiment, the transmitters transmit messages comprising information indicating at least their positions, this information being stored in one or more historical databases.

A historical database is, for example, located in the satellite.

A historical database is, for example, located in a ground station.

According to one embodiment, the positions of the transmitters at a given instant are predicted by using the content of the historical database, the model used for the prediction taking into account the position of the transmitters at a given instant as well as their visibility by the antenna array onboard the satellite.

According to one aspect of the invention, for a given velocity and a direction of a transmitter, the position of a transmitter $P_{est}(t)$ at the instant t is estimated at the instant t by using the following expression:

$$P_{est}(t) = P(t_0) + \vec{d}(t-t_0)V$$

in which:
$P(t_0)$ represents the known position acquired during the last observation of the transmitter by the satellite at the instant $t_0$;
$\vec{d}(t-t_0)$ represents the direction of the transmitter during the time interval $t-t_0$; v represents the velocity of the transmitter.

According to another aspect of the invention, the prediction error $\epsilon$ is estimated by using an expression such as:

$$\epsilon = \Delta d(t-t_0)v + (t-t_0)\Delta v$$

in which:
$\Delta d$ represents the angular accuracy of direction;
$\Delta v$ the accuracy of velocity.

The predicted position of the transmitters is, for example, adjusted by using trajectory adjustment techniques by projecting the estimated position $P_{est}(t)$ of a transmitter onto a route R, said route being represented by a curve.

The predicted positions of the transmitters are, for example, stored in a database onboard the satellite.

In one embodiment, elevation and azimuth parameters representative of the incident signals such as received at the level of the various antennas of the antenna array of the satellite are deduced from the relative positions of the transmitters with respect to the satellite.

The satellite scans, for example, with the aid of a reception beam the spot associated with the satellite, a narrow lobe of the antenna diagram being determined so as to be directed by priority toward the bin or bins of the spot having a low collision density, the choice of these bins being deduced from the results of the analysis of the historical databases.

In another embodiment, the weights of the filters are determined so as to adjust M zeros of the antenna diagram in accordance with the directions of M selected interferer signals, said interferer signals being selected on the basis of an estimation of the nuisance level in terms of interference compared with a predetermined threshold value, said nuisance level being deduced from the power received and from the Doppler shift which are estimated for a given interferer signal.

The weights of the filters are adjusted, for example, on the incident signals originating from selected transmitters whose spatial separation is greater than the directivity increment of the antenna system.

Figure 2:
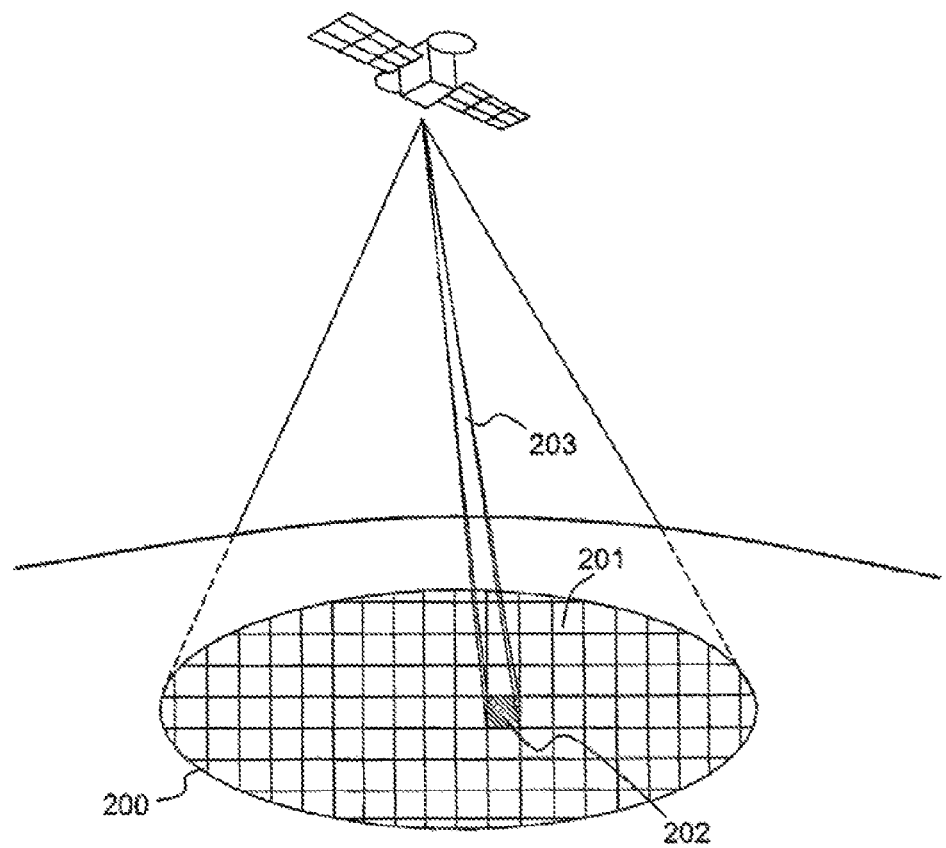
Figure 3:
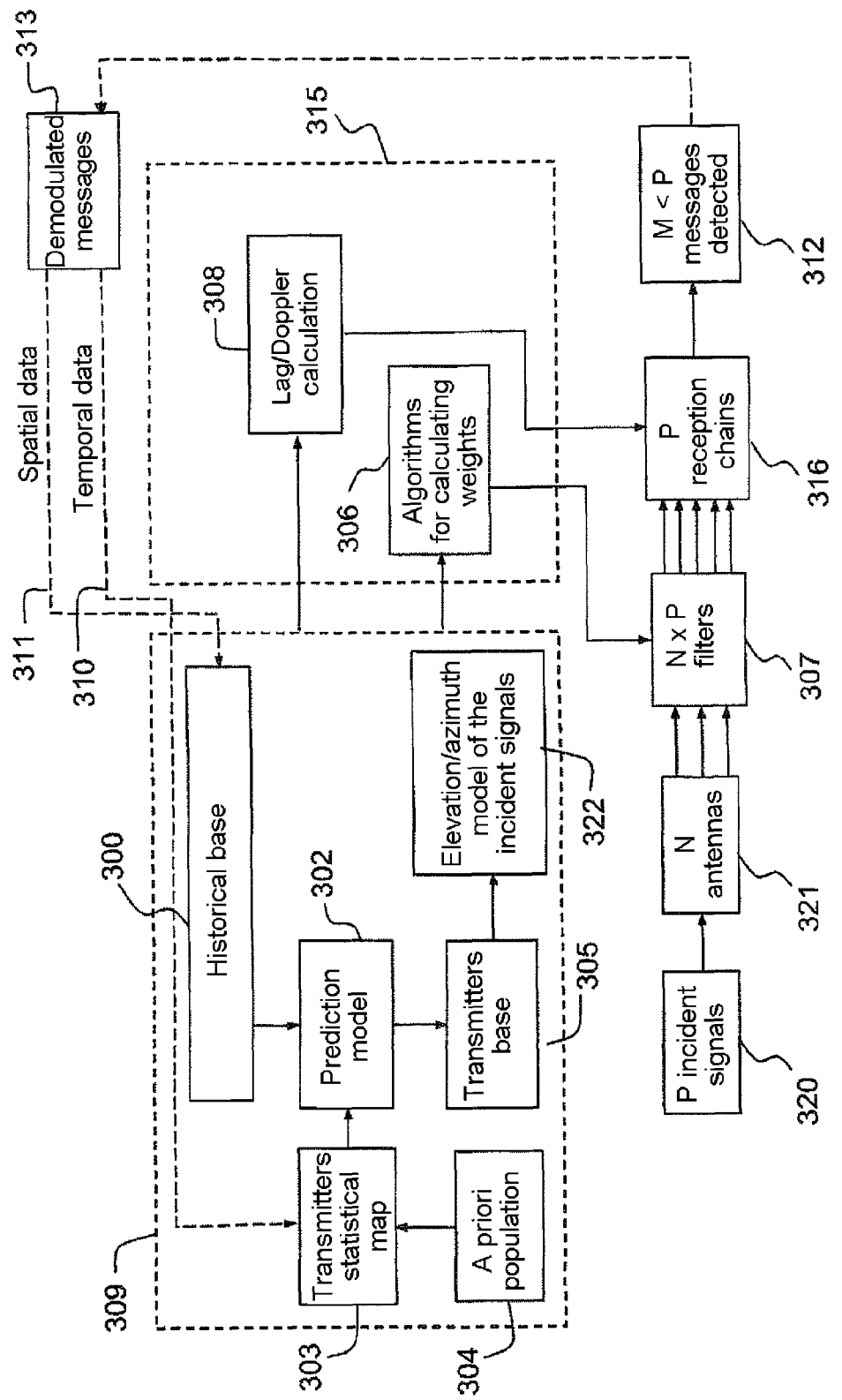

Other characteristics and advantages of the invention will become apparent with the aid of the description which follows given by way of nonlimiting illustration and offered with regard to the appended drawings among which:

FIG. 1 gives an example of reception processing operations that may be implemented at reception by a satellite, according to an embodiment of the invention;

FIG. 2 represents a satellite as well as its coverage zone;

FIG. 3 gives an exemplary implementation, according to an embodiment of the invention, of processing operations making it possible to separate signals originating from a plurality of sources.

DETAILED DESCRIPTION

The invention relates to a telecommunications system comprising at least one satellite and a plurality of transmitters transmitting toward the satellite. The transmission of the signals by the transmitters is organized into time periods, said periods being called slots or transmission slots in the subsequent description.

FIG. 1 gives an example of processing operations that may be implemented at reception by a satellite of the system. Such a satellite comprises for example N reception antennas 102 and has the capacity to process for a slot P out of S incident signals 101, that is to say P signals originating from P distinct transmitters. For a given slot, a digital processing based on a generalized diagram may be implemented and takes as input the N signals such as received at the level of the N antennas 102 after digitization and applies P digital filters for each of these N signals 103, the filtering coefficients possibly being different for each filter. The coefficients of these filters are determined so as to separate the P incident signals received in one and the same slot. The SAF technique using a generalized diagram is based on the estimation and the inversion of a correlation matrix representative of the transmission channel 107 for a chosen number of P incident signals and for each of the P outputs on which one of the signals to be isolated is detached from the noise. The estimation of the covariance matrix and therefore the calculation of the coefficients of the N filters depends on assumptions made as regards the direction of arrival 106 of the P incident signals, as represented for example by elevation and azimuth parameters.

The generalized diagram algorithm mentioned above is based on the inversion of the covariance matrix, described in numerous publications, or the vector W of the weights is determined by using the following expression:

$$W = M^{-1} \times W_0 \qquad (1)$$

in which:
$M^{-1}$ represents the inverse of the covariance matrix of the noise and of the interference;
$W_0$ represents the vector whose components are the optimal weights to be applied in the absence of interference.

After application of the N×P digital filters 103, at least P reception chains 104 make it possible to process the P incident signals in such a way as to demodulate and decode the digital message carried by them. Assumptions as regards the Doppler shift and the reception lag 108 may be taken into account to improve these processing operations. Advantageously, assumptions 106 relating to the position of the transmitters may be used to finely determine the covariance matrix and deduce therefrom the filtering coefficients 107.

Feedback-based adaptation techniques of LMS type are also applicable per slot.

Processing operations of this type apply to any satellite communications system comprising at least one satellite receiving signals originating from a plurality of transmitters, said transmitters being onboard for example boats or terrestrial vehicles whose transmissions are not coordinated, that is to say the transmitters are not synchronized precisely with respect to one another, the transmissions possibly arriving shifted temporally at the level of the receiver or receivers of the system. In systems such as for example AIS, the multiplexing of the signals transmitted by the various transmitters is based on a temporal multiplexing of the transmissions per slot and a frequency multiplexing of the transmissions on several channels. The implementation of these multiplexings is not sufficient to avoid collisions between signals originating from several distinct sources and to be able to recover at the level of the satellite receiver the transmitted information, that is to say the various digital messages.

The signal separation implemented within the framework of the invention utilizes notably the principle of spatial diversity. The method according to the invention selects several messages from among the messages received. The aim is to detect these messages entirely, that is to say to recover the set of useful bits, for example 84 bits per message. In a system of type according to the invention, the same message may be transmitted several times by one and the same terrestrial transmitter during a given period in such a way as to introduce temporal redundancy and enhance the reliability of message transmission. A historical log of the transmissions of messages may be used so as to produce reception statistics making it possible to predict the arrival of the incident signals. On this basis, the method determines the coefficients of the adaptive filters used by the satellite at reception while reducing the assumptions as regards the position of the transmitters on the basis of calculation schemes.

An exemplary implementation is given in the subsequent description and calls upon at least one array of antennas whose phases are controlled by a weight vector, said vector being determined by the inversion of the covariance matrix, the weight vector components corresponding to the coefficients of the reception filters.

FIG. 2 represents a satellite as well as its coverage zone. The zone 200 covered by a satellite is called a task in the subsequent description. This task 200 is customarily associated with a slicing grid 201, this grid being composed of bins 202 defined by elevation/azimuth parameters making it possible to direct the reception beam of the satellite 203 toward said bins. A bin is said to be dense if it comprises a significant number of transmitters and if collisions of signals originating from said transmitters are frequent at the level of the satellite. Dense bins correspond for example to maritime routes or dense zones. By way of example, the Mediterranean sea may be considered to be a dense zone.

FIG. 3 gives an exemplary implementation according to the invention of processing operations making it possible to separate signals originating from a plurality of sources.

The reception processing operation comprises several processing blocks making it possible to adapt the reception filters 307. A first processing block 309 corresponds to the acquisition of data and to their analysis. The objective of a second processing block 315 based on the results of the first processing operation is to determine the coefficients of the N×P reception filters 307, said filters being applied to the signal received at the level of the satellite being composed notably of the combination of S incident signals 320 originating from S distinct transmitters, said signal being received on N antennas 321.

The first processing block 309 corresponds to an acquisition and an analysis of data. In a system such as AIS, the various transmitters transmit signals comprising messages indicating their position as well as other information specific to them. Preferably, this information is preserved together with other information relating to the satellites of the system in a global database 300 on the ground and/or a local database, that is to say located in the satellite. These databases are called historical databases in the subsequent description. The stored data can also extend to data other than the position of the transmitters such as for example:
- the identity of the transmitters;
- the destination of the transmitter;
- the type and the mission of the vehicle onboard which the transmitter is carried, for example the type of boat (fishing, transport), the type of cargo;
- the latitude, the longitude, the direction and the velocity of the transmitter;
- the transmit time, the channel used and the periodicity of the transmission;
- the position of the satellite in latitude, longitude, the latter possibly being deduced as a function of time.

A predictive model 302 making it possible to estimate the position of the transmitters can then be applied using the content of the previously described historical databases 300. This model takes into account the position of the transmitters at a given instant as well as their visibility by the antenna array onboard the satellite. Since the accuracy of the stored data decreases with time, an estimation of the direction error, of the velocity error and of the error related to the possible changes of direction of the transmitters may advantageously be taken into account.

Thus, for a given velocity and a direction, the position $P_{est}(t)$ estimated at the instant t of a transmitter is for example estimated using the following expression:

$$P_{est}(t) = P(t_0) + \vec{d}(t-t_0)v \quad (2)$$

in which:

$P(t_0)$ represents the known position acquired during the last observation of the transmitter by the satellite;

$\vec{d}$ represents the direction of the transmitter during the time interval $t-t_0$;

v represents the velocity of the transmitter.

The prediction error ϵ may be estimated using the expression:

$$\epsilon = \Delta d(t-t_0)v + (t-t_0)\Delta v \quad (3)$$

in which:

Δd represents the angular accuracy of direction;

Δv the accuracy of velocity.

This prediction model 302 may be improved by using for example trajectory adjustment techniques, notably by matching with corresponding stored trajectories or positions 303. These techniques are customarily designated by the expression "map-matching". Statistics may be associated with maps on which there appear the usual positions of the transmitters 304 traversing these maps and corresponding for examples to maritime routes, fishing zones or operational zones.

If R is a single route intersecting an uncertainty circle denoted $C(P_{est}(t),\epsilon)$, said circle being centered on the estimated position $P_{est}(t)$ and having as radius the accuracy value ϵ, the position corrected by the prediction model is then given by the expression:

$$P_{corr}(t) = \text{Proj}(P_{est}(t), R) \quad (4)$$

in which:

Proj( ) represents a function for projecting the position $P_{est}(t)$ onto the route R, said route being represented by a curve.

When several routes are candidates, the route used for the previous estimation is for example favored.

The analysis 302 of the navigational historical log is stored 300 for a given transmitter or transmitters belonging to a transmitter class, a transmitter class corresponding to a type of vehicle onboard which the transmitter is carried. It is thus possible to distinguish classes corresponding to cargo boats or trawlers. A statistical analysis of the historical log 302 can also be used to characterize the behavior of the transmitters. Measurements of the behavior of the transmitters may be carried out such as for example measurements of the frequency of change of velocity and of direction, of the maximum values of second derivative characterizing the limits of acceleration/deceleration and of turning, their absolute values aggregated per transmitter and per transmitter class. These data may notably be used to correct the position estimation, for example by defining the accuracies of $\Delta d$ and $\Delta v$ for a "map-matching" applied to a given transmitter.

The result of the statistical analysis of the historical log 302 corresponds for example to a database 305. This base contains notably predictions relating to the predicted population of transmitters at a given time. This base stores for example the positions of each transmitter and associates them with a given bin. This base may also contain a measurement of the density of each bin, that is to say of the number of transmitters per bin.

The data relating to the position of the transmitters of the database 305 which result from the predictive analysis 302 may be advantageously used to characterize 322 the incident signals originating from the various identified transmitters. Thus it is possible to deduce from the relative position of the transmitters with respect to the satellites elevation and azimuth parameters associated with said signals.

The objective of the second processing block 315 based on the results of the first processing block 309 is to determine the coefficients of the reception filters N×P.

Advantageously, the method improves the separation of messages colliding at the level of the satellite by using one or more techniques described hereinafter, which include spatial pointing, elimination of interference and predictive tracking of the transmitters.

As explained previously, the transmitters of the system transmit their messages in a transmission slot. On the basis of these transmit periods, it is possible to compare the messages actually picked up by the satellite with the predicted transmissions and to preserve a measurement of effective detection of the messages received from each transmitter.

Three types of techniques 306 that may be implemented are described in the subsequent description, said processing operations making it possible to calculate the weights, it being possibly to extend the invention to other techniques.

A first technique 306 that may be implemented within the framework of the invention is to use a processing by narrow beam intelligent scan. Based on the data relating to the position of the transmitters 305 and/or to the incident signals 322, the algorithm chooses one or more bins under the task of the antenna and directs thereat a narrow lobe so as to detect therein one of the predicted signals. The signals at the filter output 307 then correspond to the signals transmitted in these bins. The determination of the coefficients of the filters on the basis of a known-transmitter position forms part of the general knowledge of the person skilled in the art. An example of such a determination is described in the book by Robert J. Mailloux entitled *Phased Array Antenna Handbook*, paragraph 3.3.3, second edition, Artech House Antennas and Propagation Library.

For a given position of the satellite, the method according to the invention classes, for example by order of priority, the transmitters according to their azimuth/elevation coordinates. The transmitters of high priority are those belonging to a bin for which the collision density is low, the collision density corresponding to the mean number of signals transporting messages originating from different transmitters and colliding in one and the same slot. It is consequently for these transmitters that the probability of detection obtained at reception will be the highest. Thus, the bins having a low collision density are selected by priority during the repeated scan of the spot by the satellite reception beam. This selecting of bins is performed by relying on the analysis result 309 stored 305, 322.

In the case where several antenna arrays are available in the system, said antenna arrays being distributed over one or more satellites, the bins making up the zone to be covered by the satellite may be advantageously distributed among the antenna arrays which see them. By way of example, in a system relying on a constellation of satellites, several satellites can pass above one and the same zone exhibiting a significant collision density. The processing of the messages originating from the various transmitters present in the zone to be covered by the system may be distributed over time and among the various satellites of the constellation so as to use all the available calculational power.

A second technique 306 that may be implemented within the framework of the invention to improve the separation of the colliding messages is to use a scheme for suppressing multiple interference.

In order to implement the technique for suppressing multiple interference, M interferer signals separated spatially by at least one value corresponding to the directivity increment of the antenna are selected. This selection is done for example on the basis of an estimation of the nuisance level in terms of interference, said level corresponding to a power received and to the estimated Doppler shift for a given interferer signal.

The weights of the filters are then determined 307 so as to bring the M zeros of the antenna diagram in accordance with the directions of the selected interferer signals. The effect of this is to improve the signal-to-interference ratio. The weights of the filter may be pre-calculated and preloaded into a table on the M interferers so as to avoid calculation by the satellite-borne equipment. Such a technique is described notably in the book by Robert J. Mailloux cited previously.

A third technique 306 that may be implemented within the framework of the invention to improve the separation of the colliding messages is to use a scheme implementing interleaved predictive tracking. Since it is possible to detect only a limited number of P transmitters per slot, it is advantageous to distribute over the set of slots of a tracking period the search for the transmitters so as to give to attain probabilities of detection identical for each transmitter. For a long tracking period, a tracking period possibly being as much as an hour, the prediction may be unusable. It is then necessary to fix a shorter tracking period than the user requirement, so as to maintain the global data of the system. The selection of the transmitters searched for on a slot must also ensure sufficient spatial separation. It must be greater than the directivity increment of the antenna system, so as to increase the probability of detection.

In this case, a selection of at least one of the incident signals is carried out, the detection of this signal being favored.

The spatial separation approach is particularly necessary when there is a number S of incident signals greater than N, the number of antennas, and two embodiments make it possible to choose the P transmitters with P<N from among the S incident ones, knowing that the detection is over a long tracking period, greater than the period of repetition of the transmitters: priority-based choice described previously and interleaving described hereinafter. In both cases, the number of transmitters aimed at in the detection step is reduced to P<N.

In a tracking period, all the transmitters will be marked progressively. On each slot, the first P unmarked predicted transmitters are aimed at by the detection, and then marked. Thus they will no longer be aimed at in the same period before a chance of detection has been allotted to each transmitter. When such is the case, the marks are reinitialized for all the transmitters which have not been detected. Thus the transmitters are also distributed, that is to say interleaved, over all the transmission slots in the tracking period, until they are detected.

The adaptation 306 of the weights of the reception filters 307 is then carried out by tracking the transmitters. The generalized diagram SAF technique mentioned previously in the description is used.

At the output of the phased array digital processing, the reception chain may be improved through the use described previously of the data 305, 322 resulting the acquisition and analyses 309. This use makes it possible to improve the calculation of the propagation lag and of the Doppler shift 308 associated with the incident signals and also to adapt the size of the frequency window and time window on the basis of the knowledge of the predicted position of the transmitters. This helps to improve the sensitivity of the processing chains after filtering 316, and makes it possible to isolate the messages whose content is useful 312 from the residual interferers.

Advantageously, synchronization with the carrier of a signal is facilitated by the calculation of the Doppler shift, said shift being deduced from the elevation and azimuth parameters of the searched-for transmitter. Moreover, the temporal synchronization required for the demodulation, which is done for example by using a training sequence, is significantly accelerated.

Several feedback signals 310, 311 can also be used so as to improve the separation at reception. These signals are determined on the basis of the demodulated messages 313 at the output of the reception filters 307. The temporal data 310 and spatial data 311 contained in the demodulated messages 313 in the current slot make it possible to update respectively the historical databases 300 and statistics of distribution of the signals received 303 and make it possible to measure the effectiveness of the algorithms used. An exemplary measurement of effectiveness corresponds for example to the number of messages demodulated and decoded correctly for a given power level at reception.

These feedback signals 310, 311 make it possible notably to refine the information related to the distribution of the transmitters 303 on the basis of the messages detected. They also make it possible to predict the next incidence of the signal originating from a given transmitter.

A system implementing the method according to the invention can use one or more algorithms 306 for calculating filter weights. The selection of the algorithm for calculating the weights of the reception filters may be performed dynamically. Said selection may be performed at the level of the receiver equipment of an antenna system, that is to say aboard the satellite or else by remote equipment, a ground station for example.

Thus, the system may apply for example one or more of the three techniques described above. Thus, it may begin by applying the first technique by scanning the dense bins to initialize the positions of the largest number of transmitters and then reuse this technique for an update of the historical databases 300. Thereafter, one of the other two techniques described above may be used to determine which of the transmitters have not yet been considered.

The invention claimed is:

1. A satellite telecommunications system, comprising:
at least one satellite receiving signals originating from a plurality of transmitters present in a surveillance zone called a task, a transmission of the signals by the transmitters being discontinuous and organized into time slots, the satellite comprising an array of reception antennas;
a set of digital reception filters being associated with each antenna, means for separating the signals originating from various transmitters and the signals colliding in one and the same slot, said means for separating adapting coefficients of the digital reception filters, said coefficients being deduced from predictions of positions of the transmitters,
wherein the positions of the transmitters at a given instant are predicted by using a content of a historical database comprising a historical log of the positions of the transmitters, a model used for the prediction taking into account the position of each of the transmitters at a given instant as well as their visibility by the antenna array onboard the satellite; and
wherein, for a given velocity and a direction of a transmitter, a position $P_{est}(t)$ of the transmitter at instant t is estimated at the instant t by using the following expression:

$$P_{est}(t)=P(t_0)+\vec{d}(t-t_0)V$$

in which:
$P(t_0)$ represents the known position acquired during a last observation of the transmitter by the satellite at the instant $t_0$;
$\vec{d}(t-t_0)$ represents the direction of the transmitter during a time interval $t-t_0$; and
v represents the velocity of the transmitter.

2. The system according to claim 1, wherein the transmitters transmit messages comprising information indicating at least their positions, the information being stored in one or more historical databases.

3. The system according to claim 2, wherein one of the one or more historical databases is located in the satellite.

4. The system according to claim 2, wherein one of the one or more historical databases is located in a ground station.

5. The system according to claim 1, wherein the prediction error $\epsilon$ is estimated by using an expression:

$$\epsilon=\Delta d(t-t_0)v+(t-t_0)\Delta v$$

in which:
$\Delta d$ represents the angular accuracy of direction;
$t-t_0$ represents a time interval;
v represents velocity; and
$\Delta v$ represents the accuracy of velocity.

6. The system according to claim 1, wherein the predicted position of each of the transmitters is adjusted by using trajectory adjustment techniques by projecting the estimated position $P_{est}(t)$ at a time t of each transmitter onto a route R, said route being represented by a curve.

7. The system according to claim 1, wherein the predicted positions of the transmitters are stored in a database onboard the satellite.

8. The system according to claim 1, wherein elevation and azimuth parameters representative of incident signals received at the level of the various antennas of the antenna array of the satellite are deduced from the relative positions of the transmitters with respect to the satellite.

9. The system according to claim 1, wherein the satellite scans with the aid of a reception beam a spot associated with the satellite, a narrow lobe of an antenna diagram being determined so as to be directed by priority toward a bin or bins of the spot having a low collision density, the choice of these bins being deduced from results of analysis of the historical databases.

10. The system according to claim 1, wherein weights of the filters are determined so as to adjust M zeros, wherein M is a number, of the antenna diagram in accordance with directions of M selected interferer signals, said interferer signals being selected on a basis of an estimation of a nuisance level in terms of interference compared with a predetermined threshold value, said nuisance level being deduced from the power received and from the Doppler shift which are estimated for a given interferer signal.

11. The system according to claim 1, wherein weights of the filters are adjusted on incident signals originating from selected transmitters whose spatial separation is greater than a directivity increment of an antenna system.

12. The system according to claim 1, wherein weights of the filters are determined on each slot so as to extract some of the messages predicted in this slot, in accordance with a dynamically defined order of priority, the priorities being calculated on the historical database so as to attain fixed objectives of system performance.

13. The system according to claim 1, wherein weights of the filters are determined so as to extract a subset of predicted transmitters in accordance with a period of each, the set of the transmitters also being distributed over all the transmission slots in the tracking period, until detection.

* * * * *